United States Patent [19]
Johansson
[11] 4,295,070
[45] Oct. 13, 1981

[54] MEANS FOR PROVIDING A MECHANICALLY DEFINABLE SELECTED TRIGGER INTERVAL IN A FLYWHEEL MAGNETO

[75] Inventor: Sven H. Johansson, Amal, Sweden
[73] Assignee: Aktiebolaget Svenska Elektromagneter, Amal, Sweden

[21] Appl. No.: 48,685
[22] Filed: Jun. 14, 1979
[30] Foreign Application Priority Data
Jun. 16, 1978 [SE] Sweden ............................... 7806971
[51] Int. Cl.³ ............................................ H02K 21/22
[52] U.S. Cl. ................................................... 310/70 R
[58] Field of Search .............. 310/70 R, 70 A, 153 R, 310/156

[56] References Cited
U.S. PATENT DOCUMENTS
4,074,669 2/1978 Cavil et al. ..................... 310/153 X
4,166,966 9/1979 wittlinger et al. ................ 310/70 X
4,170,206 10/1979 Katsumata et al. ............. 310/153 X

*Primary Examiner*—Donovan F. Duggan
*Attorney, Agent, or Firm*—Hill, Van Santen, Steadman, Chiara & Simpson

[57] ABSTRACT

In the disclosed ignition apparatus for internal combustion engines provided with flywheel magnetos, the ignition spark interval is purely mechanically provided at the manufacturing stage. In the direction of rotation, the edges of both pole shoes and core legs which meet each other are sharply defined. The pole shoe, first in the direction of rotation, is formed so that it substantially coacts with the leg, second in the direction of rotation, when the leading edge of the second pole shoe comes into coaction with the front edge of the leg situated first.

1 Claim, 7 Drawing Figures

MEANS FOR PROVIDING A MECHANICALLY DEFINABLE SELECTED TRIGGER INTERVAL IN A FLYWHEEL MAGNETO

BACKGROUND OF THE INVENTION (a) Field of the Invention

The present invention refers to an apparatus for providing a mechanically selectable trigger interval in flywheel magnetos.

(b) Prior Art

Flywheel magnetos are usually made for coaction with so-called electronic ignition circuits. A magnetic core is usually arranged with two or more legs having different windings on the respective leg for coaction with the passing magnets on the flywheel. In such construction, one of the legs carries a winding for generating trigger pulses to trip the current circuit of a thyristor-controlled capacitor used in electronic ignition current circuits. It is very important to mechanically position the legs in relation to the magnets so that triggering is obtained at the desired point in a revolution. U.S. Pat. No. 3,599,615 deals with this problem, and in it the pole surfaces of the leg carrying the trigger winding are specially formed to obtain the desired triggering function. It is, however, expensive to form special magnetic cores for each type of engine so that the trigger function occurs at the desired point in a revolution. Furthermore, it is difficult to determine the triggering points mechanically, and adjustment must always be available on the magnetic core for suiting it to the associated engine in question.

SUMMARY OF THE INVENTION

There is a need to provide an initially correct mechanical setting of the relative positions of the coacting parts in the ignition apparatus in conjunction with the appropriate piston position of the engine, i.e. the angular position of its crankshaft. The present invention is a simple solution to the problems discussed.

The features of the present invention are apparent from the following patent claims.

An embodiment of the invention is described in detail with reference to the accompanying drawings.

ON THE DRAWINGS

AS SHOWN ON THE DRAWINGS

Figure 1:
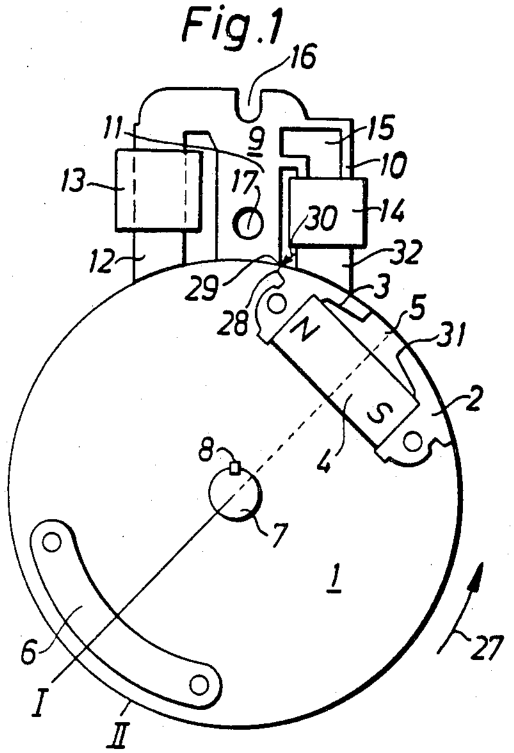
FIG. 1 illustrates schematically a flywheel provided with magnet poles and a magnetic core coacting therewith in one relative rotational position.
Figure 2:
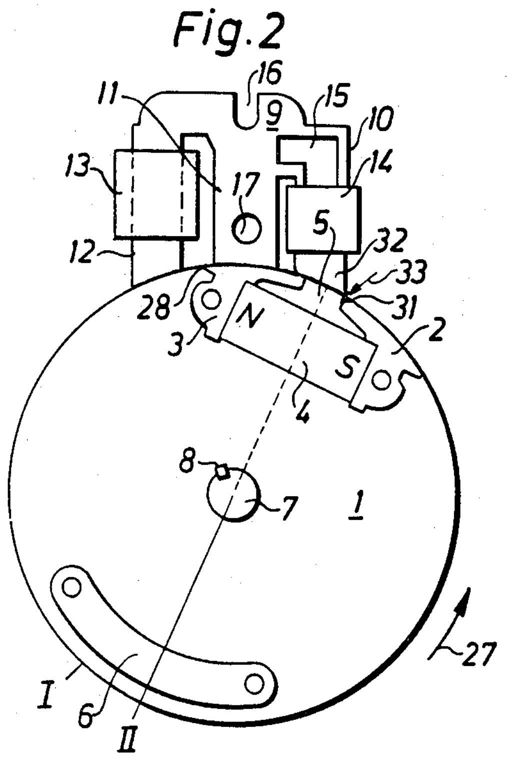
FIG. 2 shows the apparatus of FIG. 1 in a second rotational position.

The apparatus shown in FIGS. 1 and 2 includes of a flywheel 1 of non-magnetic material, which at its circumference carries two pole shoes 2 and 3 of magnetically conductive material, having between them a bar magnet 4 with poles N and S. A gap filled with a magnetically non-conducting material is between the pole shoes 2 and 3. On the opposite side of the flywheel is a counterweight 6 for balancing. The flywheel is mounted on an engine shaft 7 and is non-rotatably attached thereto by means of a key 8. A three-legged core 9 of magnetically conductive material is supported for coaction with the flywheel. In the direction of rotation of the flywheel, it has a first leg 10, a middle leg 11, and an other outer leg 12. A coil 13 on the third leg 12 provides pulses for charging a capacitor 21 in the circuit in a known way. On the first leg 10 a winding 14 constitutes the generator winding for a trigger circuit, and is referred to hereinafter as the trigger coil. For conventional adjustment of the magnetic coupling between the first or trigger leg and the remaining parts of the core 9, a recess 15 is made in the core material. A notch 16 and a hole 17 in the core enable screw attachment to an associated engine casing.

Figure 3:
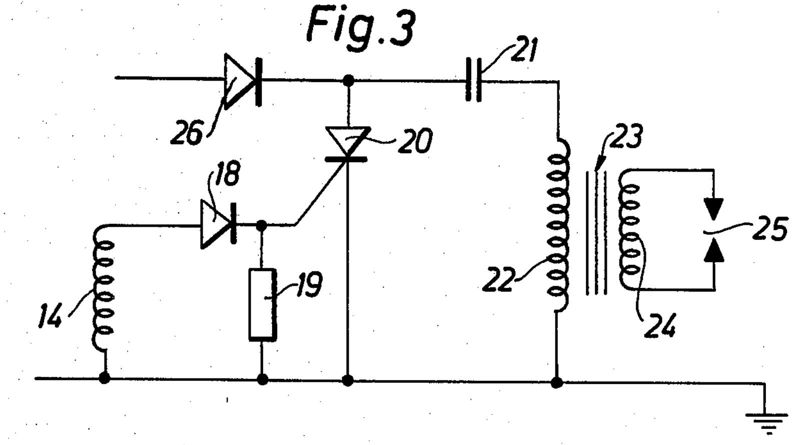
FIG. 3 is a schematic diagram of a coacting trigger circuit.

As illustrated in FIG. 3, the trigger coil 14 is connected to a diode 18, the output side of which is connected to a circuit loading resistor 19 and the control electrode of a thyristor 20. The terminal from the thyristor cathode is grounded as are also the other terminals of the resistor 19 and the trigger coil 14. The thyristor 20 is part of a discharge circuit including the capacitor 21 and a primary winding 22 of an ignition transformer 23, a secondary winding 24 of which is connected to an associated spark plug 25. A charging diode 26 is connected to the capacitor 21. The diode 26 is in circuit (not shown) with the coil 13.

The apparatus functions in the following mode. With the flywheel in the position denoted I, and with the direction of rotation denoted by the arrow 27, the leading edge 28 of the pole shoe 3 is opposite the first corner 29 of the second leg 11, as denoted by the arrow 30. The pole shoe 3 thus covers the whole end surface of the leg 10 carrying the trigger coil 14. In the next angular position shown in FIG. 2, the leading edge 31 of the other pole shoe 2 is just at the forward edge portion 32 of the leg 10 as indicated by the arrow 33. The two positions here illustrated are quite decisive as is explained below.

Just before the pole shoe 3 (north pole) comes to the position I as illustrated in FIG. 1, it is solely in coaction with the leg 10. During rotation, a so-called initial pulse is obtained. The winding direction of the coil 14 and the polarity connection to the diode 18 is such that the initial pulse goes in a direction negative in relation to the diode 18. The initial pulse furthermore has a relatively low voltage. The initial pulse is formed by flux leakage going from the pole shoe 3 e.g. through the second leg 11 and through the air to the south pole of the magnet 4. As soon as the pole shoe 3 has come into coaction with the second leg 11, as illustrated in FIG. 1, this flux leakage ceases and the flux in the leg 10 decreases steeply, i.e. goes in the same direction as a coming flux change when the pole shoe 2 comes into coaction with the leg 10, as is apparent from FIG. 2. There is thus obtained, when the pole shoe 3 comes into coaction with the leg 11, a first build-up of the desired trigger pulse 34 shown in FIG. 4, where the portion 35 denotes the situation at position I. As the flywheel rotates to the position shown in FIG. 2, and when the leading edge 31 of the pole shoe 2 comes into coaction with the corner portion of the leg 10, there is provided a maximum flux change which forms the crest portion 36 of the triggering curve 34 in FIG. 4. A sloping portion 37 on the curve 34 is obtained, indicating a gradual growth between the positions I and II. With increasing rpm, the trigger pulse 34 grows in height as is shown by the two dashed curves 34′ and 34″. The curve 34 and the other curves 34′ and 34″ always start in position I, with the first sharply increasing portion 35, 35′ and 35″.

As a result of the length and form of the pole shoe 3, it will always coact with both limbs 10 and 11 simultaneously when it has reached the position I. The flux change reaction will thus always occur in this position independent of the speed, but naturally the voltage is altered with altered rpm. This condition also applies to the curve crest 36. This crest is obtained when the leading edge 31 of the pole shoe 2 arrives at the outer corner 32 of the leg 10. This position, which causes immediately increased flux, since the flux definitely begins to flow through the legs 11 and 10, is also completely defined and mechanically stable.

As shown by the curves 34′ and 34″, the curve crest 36 increases to the crests 36′ and 36″ respectively. If the triggering level is taken at the dashed line 38 in FIG. 4, there will be triggering at position II for low rates of revolution, since the crest 36 comes up to the triggering level 38 in this position. As the speed of the engine increases, the curve height also increases. When a rate of revolutions has been reached corresponding to the curve 34′, triggering will take place at position III, displaced a distance from position II towards position I along the sloping curve portion 37′. When engine working speed has been attained, the curve has grown to 34″, and the curve hump 35″ is then at the triggering level. This speed causes triggering to be obtained at the position I. Thus, ignition advance is obtained automatically within accurately defined limits, e.g. between idling and working rpm in the present case. No further ignition advance due to a higher speed can be obtained, since position I is mechanically fixed and thus cannot wander. In practice automatic speed regulation is thus obtained for the engine, which is very advantageous in conjunction with chain saws, for example. Surge rpm are thus not obtained for an engine in an unloaded state. The curves shown apply to rpm ranges between about 400 rpm and 8000 rpm in a practical embodiment.

Figure 5:
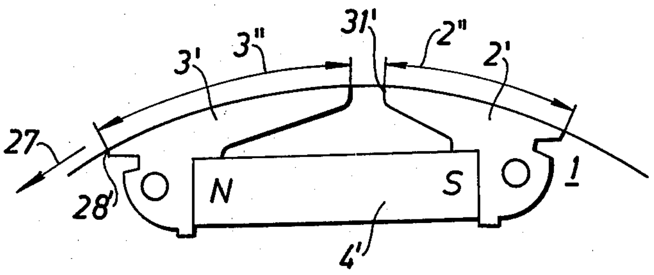
FIG. 5 shows a further magnet pole arrangement.

If the core system 9 with associated windings and electronics is to be applied to an engine which has triggering positions deviating from the first-mentioned example, alterations can be made, as illustrated in FIG. 5, of the length of the pole shoes 2′ and 3′ so that the pole shoe 2′ is a given length 2″, and the pole shoe 3′ a length of 3″. The forward edge 28′ of the pole shoe 3 is furthermore moved in somewhat in relation to that of FIGS. 1 and 2, and with regard to the fact that the pole shoe 2′ is shorter than the pole shoe 2 in FIGS. 1 and 2, its front edge 31′ will also be moved. It follows from this that both position I and position II will deviate from what is shown in FIGS. 1 and 2, and thus new, well-defined end positions for limiting the total width of the pertinent trigger pulse are obtained.

Figure 4:
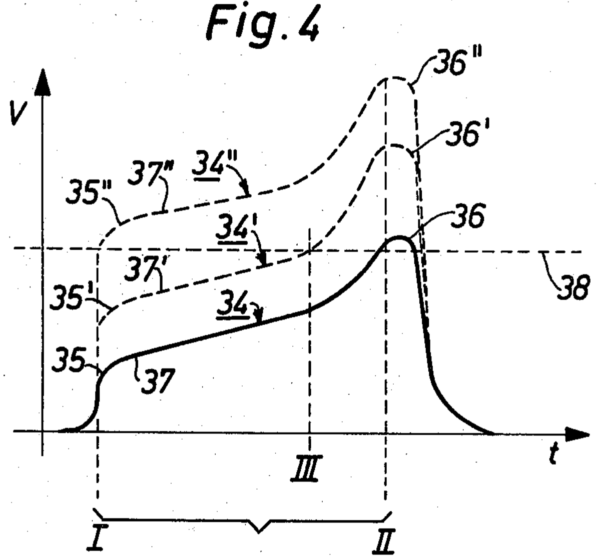
FIG. 4 shows graphs of the triggering sequence under different operational conditions.
Figure 6:
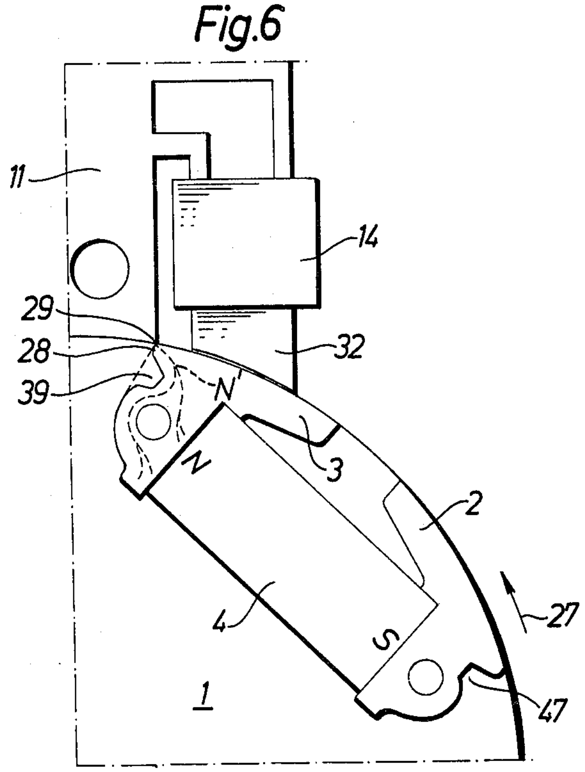
FIG. 6 illustrates a relative rotational position.

In order to achieve an operation desired it is important that the trigger curves have the basic shape shown in FIG. 4, i.e. a defined raising portion 35 followed by an inclined portion 37 which ends up in a peak 36. The shape of the curve is directly dependent on the configuration of the pole shoes. The leading edge 28 of the pole shoe 3 defines the portion 35 of the curve. FIG. 6 illustrates the flux conditions present. Beneath the edge 28 there is a notch 39 which is essential for the correct function. When the pole shoe 3 is in such a position that the said edge 28 is close to the corner 29 of the limb 11, there will be a flux N1 through portions of reduced material thickness towards the edge 28 resulting in a correct induction. However, if no notch 39 were present (straight dotted line) the magnetic flux resistance would be minimized resulting in a strong induction and as a consequence the curve portion 35 would be larger and achieve an unacceptable level.

Figure 7:
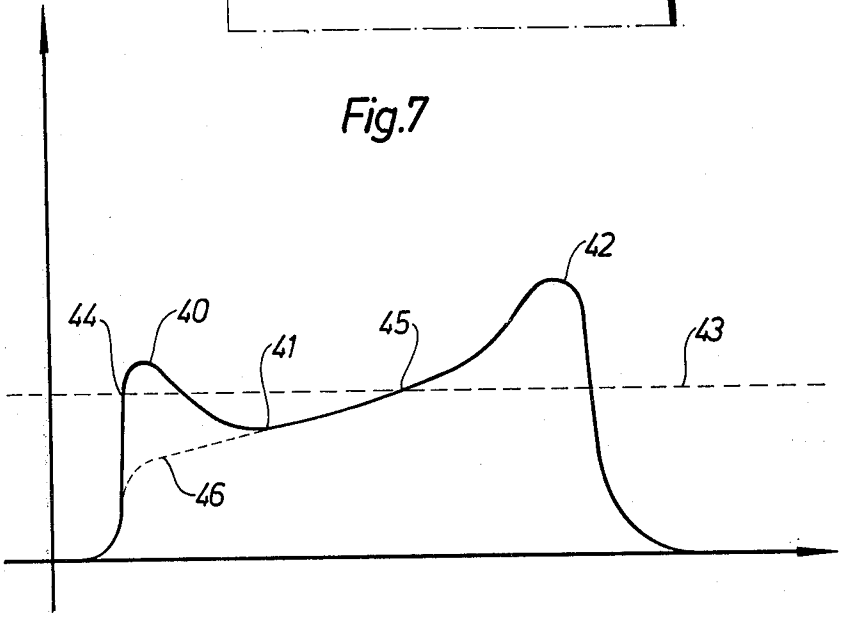
FIG. 7 is a curve discussed in connection with FIG. 6.

FIG. 7 shows what would happen to the trigger curve in the last mentioned case. The initial curve branch would raise to a peak 40 followed by a valley 41 and a final peak 42. If the trigger level 43 were as shown in FIG. 7, the triggering would be initiated at a point 44, i.e. immediately before the peak 40. In relation to an rpm in question of an associated engine the triggering would not have been taken place until the point 45 where the trigger level intersects the curve after the valley 41. The ignition operation would thus be interfered with and wrong in such a case.

By providing the notch 39 the magnetic flux becomes reduced in the initial state resulting in curve shapes as illustrated by FIG. 4 and the dotted portion 46 of FIG. 7.

As shown particularly in FIG. 6 the pole shoe 2 is also provided with a notch 47 similar to the notch 39 of the pole shoe 3. The notch 47 is not as important as the notch 39 in practice. However, it contributes effectively to the forming of a smooth curve tail by continuously decreasing the flux. Thus sharp changes of the flux are avoided which otherwise may generate undesirable voltage peaks.

Adapting an ignition apparatus to many different types of engines can be accomplished with simple measures, without needing to alter the magnetic core portion with associated windings and electronics. An extremely well-defined triggering pulse is furthermore obtained, the extent and position of which can easily be determined mechanically and kept absolutely within the stipulated limits during all prevailing operating conditions.

Purely from the point of view of manufacturing the flywheel, the procedure is to manufacture the pole shoes 2 and 3 in one peripherally bridged piece. In the intermediate space, i.e. where the gap 5 is to be between the shoes, a depression is milled out from within. The shoes and magnet are subsequently molded together in the flywheel, after which the outer periphery of the flywheel is machined by turning, so that the connection between the shoes 2 and 3 is removed, to provide the intermediate space 5. A plurality of pole shoe blanks with millings in positions suited to different types of engines can thus be prepared and stored.

Since each engine type has its specially designed cooling fan, each flywheel is a unit unique to the appropriate engine, and the pole shoe configuration specially formed for the engine in question can be molded into this unit, while the other parts of the associated ignition system can be used as standard components for different engine types.

What I claim is:

1. A flywheel magneto in an electronic ignition circuit, including:

(a) a flywheel;

(b) a ferromagnetic core having in succession a first leg, a second leg, and a third leg, each leg terminating at the periphery of said flywheel;

(c) a trigger coil in said circuit and carried on said first leg, and a charging coil carried on said third leg;

(d) a pair of magnetic pole shoes and a permanent magnet disposed between said shoes and jointly molded into said flywheel, said pole shoes being disposed at the periphery of said flywheel in magnetic circuit with said permanent magnet, a first of said shoes, situated first in the direction of rotation of said flywheel, having such extent that its flux can coact with said first and second legs in one position, said first pole shoe having a notch underlying its leading edge for limiting initial flux transfer to said second leg, the leading edge of said one shoe being sharply defined, the leading edge of a second of said shoes, thereafter, coming to the first encountered edge of said first leg where the magnetic flux of said second shoe begins to coact with magnetic flux in said second leg;

(e) a first-encountered edge of each of said first and second legs being sharply defined and registering with the path of movement of said pole shoes; and (f) the distance between said leading edges defining the duration of a triggering signal induced in said trigger coil, said signal beginning in response to said leading edge of said first shoe encountering the first-encountered edge of said second leg, and said signal ending in response to said leading edge of said second shoe encountering the first-encountered edge of said second leg.

* * * * *